(12) United States Patent
Mamrak et al.

(10) Patent No.: US 11,584,073 B2
(45) Date of Patent: Feb. 21, 2023

(54) VIBRATION ISOLATION DEVICE FOR AN ADDITIVE MANUFACTURING MACHINE

(71) Applicant: General Electric Company, Schenectady, NY (US)

(72) Inventors: Justin Mamrak, Loveland, OH (US); MacKenzie Ryan Redding, Mason, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/761,623

(22) PCT Filed: Nov. 2, 2018

(86) PCT No.: PCT/US2018/058845
§ 371 (c)(1),
(2) Date: May 5, 2020

(87) PCT Pub. No.: WO2019/094273
PCT Pub. Date: May 16, 2019

(65) Prior Publication Data
US 2021/0178675 A1 Jun. 17, 2021

Related U.S. Application Data

(60) Provisional application No. 62/584,143, filed on Nov. 10, 2017.

(51) Int. Cl.
*B29C 64/209* (2017.01)
*B33Y 30/00* (2015.01)
(Continued)

(52) U.S. Cl.
CPC .......... *B29C 64/209* (2017.08); *B29C 64/165* (2017.08); *B29C 64/214* (2017.08);
(Continued)

(58) Field of Classification Search
CPC ... B29C 64/209; B29C 64/165; B29C 64/214; B29C 64/268; B29C 64/364; B33Y 30/00; F16F 15/08
See application file for complete search history.

(56) References Cited

U.S. PATENT DOCUMENTS 3,918,170 A  11/1975  Mercier
4,270,675 A  6/1981  Wicks et al.
(Continued)

FOREIGN PATENT DOCUMENTS

EP    3127636 A1       2/2017
WO    WO2016/030417 A1 3/2016

OTHER PUBLICATIONS

PCT International Search Report Corresponding to PCT/US2018/058845 dated Feb. 12, 2019.

*Primary Examiner* — Michael M. Robinson
(74) *Attorney, Agent, or Firm* — Dority & Manning, P.A.

(57) ABSTRACT

An additive manufacturing machine (900) includes a build unit (904) that is supported by an overhead gantry (918). The build unit (904) includes a powder dispenser (906) including a vibration mechanism (922) and a scan unit (908) including a powder fusing device (910) for fusing or binding portions of a layer of additive powder. A vibration isolation device (932), such as a passive rubber damper (940) or an active vibration canceling mechanism (960), is positioned between the powder dispenser (906) and the scan unit (908) to prevent vibrations in the powder dispenser (906) from causing operational issues with the scan unit (908) and inaccuracies in the additive manufacturing process.

16 Claims, 9 Drawing Sheets

(51) Int. Cl.
  *B29C 64/214* (2017.01)
  *B29C 64/364* (2017.01)
  *B29C 64/268* (2017.01)
  *B29C 64/165* (2017.01)
  *F16F 15/08* (2006.01)

(52) U.S. Cl.
  CPC .......... *B29C 64/268* (2017.08); *B29C 64/364* (2017.08); *B33Y 30/00* (2014.12); *F16F 15/08* (2013.01)

(56) References Cited

U.S. PATENT DOCUMENTS

| | | | |
|---|---|---|---|
| 4,730,093 A | 3/1988 | Mehta et al. | |
| 8,884,182 B2 | 11/2014 | Lee et al. | |
| 9,486,962 B1 | 11/2016 | Dugan et al. | |
| 9,573,193 B2 | 2/2017 | Buller et al. | |
| 2005/0156481 A1* | 7/2005 | Zhou | G02B 26/106 |
| | | | 310/309 |
| 2016/0311164 A1 | 10/2016 | Miyano | |
| 2016/0332371 A1 | 11/2016 | Staroselsky et al. | |
| 2017/0036404 A1 | 2/2017 | Rengers et al. | |
| 2017/0066190 A1* | 3/2017 | Klein | B29C 64/218 |
| 2017/0341302 A1 | 11/2017 | Hochsmann et al. | |
| 2018/0056588 A1* | 3/2018 | Herzog | B29C 64/268 |

* cited by examiner

VIBRATION ISOLATION DEVICE FOR AN ADDITIVE MANUFACTURING MACHINE

PRIORITY INFORMATION

The present applicant claims priority to U.S. Provisional Patent Application Ser. No. 62/584,143 titled "Vibration Isolation Device for an Additive Manufacturing Machine" filed on Nov. 10, 2017, the disclosure of which is incorporated by reference herein.

FIELD

The present disclosure generally relates to methods and systems adapted to perform additive manufacturing (AM) processes, for example by direct melt laser manufacturing (DMLM), on a larger scale format.

BACKGROUND

Additive manufacturing (AM) processes generally involve the buildup of one or more materials to make a net or near net shape (NNS) object, in contrast to subtractive manufacturing methods. Though "additive manufacturing" is an industry standard term (ISO/ASTM52900), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model.

A particular type of AM process uses an energy source such as an irradiation emission directing device that directs an energy beam, for example, an electron beam or a laser beam, to sinter or melt a powder material, creating a solid three-dimensional object in which particles of the powder material are bonded together. AM processes may use different material systems or additive powders, such as engineering plastics, thermoplastic elastomers, metals, and ceramics. Laser sintering or melting is a notable AM process for rapid fabrication of functional prototypes and tools. Applications include direct manufacturing of complex workpieces, patterns for investment casting, metal molds for injection molding and die casting, and molds and cores for sand casting. Fabrication of prototype objects to enhance communication and testing of concepts during the design cycle are other common usages of AM processes.

Selective laser sintering, direct laser sintering, selective laser melting, and direct laser melting are common industry terms used to refer to producing three-dimensional (3D) objects by using a laser beam to sinter or melt a fine powder. More accurately, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. Although the laser sintering and melting processes can be applied to a broad range of powder materials, the scientific and technical aspects of the production route, for example, sintering or melting rate and the effects of processing parameters on the microstructural evolution during the layer manufacturing process have not been well understood. This method of fabrication is accompanied by multiple modes of heat, mass and momentum transfer, and chemical reactions that make the process very complex.

During direct metal laser sintering (DMLS) or direct metal laser melting (DMLM), an apparatus builds objects in a layer-by-layer manner by sintering or melting a powder material using an energy beam. The powder to be melted by the energy beam is spread evenly over a powder bed on a build platform, and the energy beam sinters or melts a cross sectional layer of the object being built under control of an irradiation emission directing device. The build platform is lowered and another layer of powder is spread over the powder bed and object being built, followed by successive melting/sintering of the powder. The process is repeated until the part is completely built up from the melted/sintered powder material.

After fabrication of the part is complete, various post-processing procedures may be applied to the part. Post processing procedures include removal of excess powder by, for example, blowing or vacuuming. Other post processing procedures include a stress release process. Additionally, thermal and chemical post processing procedures can be used to finish the part.

Certain conventional AM machines include a build unit that is supported by an overhead gantry. The gantry defines a build area and facilitates movement of the build unit within the build area to repeatedly deposit layers of powder and fuse portions of each layer to build one or more components. The build unit may include powder hopper that deposits a layer of additive powder and an energy source that selectively directs an energy beam to fuse portions of that layer of additive powder. However, such machines typically include a vibration mechanism attached to the powder dispenser to prevent clogging and ensure that the additive powder is dispensed or deposited evenly. Notably, such vibrations may transfer to the scan unit and affect the accuracy of the energy source.

Accordingly, an AM machine including an improved system for precisely focusing an energy beam during an AM process would be desirable. More particularly, an AM machine including a build unit that maintains the accuracy of an energy source regardless of vibrations in the powder dispenser would be particularly beneficial.

BRIEF DESCRIPTION

Aspects and advantages will be set forth in part in the following description, or may be obvious from the description, or may be learned through practice of the invention.

According to one embodiment of the present subject matter, a build unit for an additive manufacturing machine is provided. The build unit includes a powder dispenser including a vibration mechanism, the powder dispenser configured for depositing a layer of additive powder. A scan unit includes a powder fusing device for fusing a portion of the layer of additive powder and a gantry movably supports the scan unit. A vibration isolation device is positioned between and couples the powder dispenser and the scan unit.

According to another embodiment of the present subject matter, an additive manufacturing machine is provided. The additive manufacturing machine includes a build unit including a powder dispenser and a scan unit. A gantry movably supports the build unit. A vibration isolation device is positioned between and couples the powder dispenser and the scan unit.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components. In addition, the terms "upstream" and "downstream" refer to the relative direction with respect to fluid flow in a fluid pathway. For example, "upstream" refers to the direction from which the fluid flows, and "downstream" refers to the direction to which the fluid flows. Furthermore, as used herein, terms of approximation, such as "approximately," "substantially," or "about," refer to being within a ten percent margin of error.

An additive manufacturing machine is generally provided which includes a build unit that is supported by an overhead gantry. The build unit includes a powder dispenser including a vibration mechanism and a scan unit including a powder fusing device for fusing or binding portions of a layer of additive powder. A vibration isolation device, such as a passive rubber damper or an active vibration canceling mechanism, is positioned between the powder dispenser and the scan unit to prevent vibrations in the powder dispenser from causing operational issues with the scan unit and inaccuracies in the additive manufacturing process.

Figure 1:
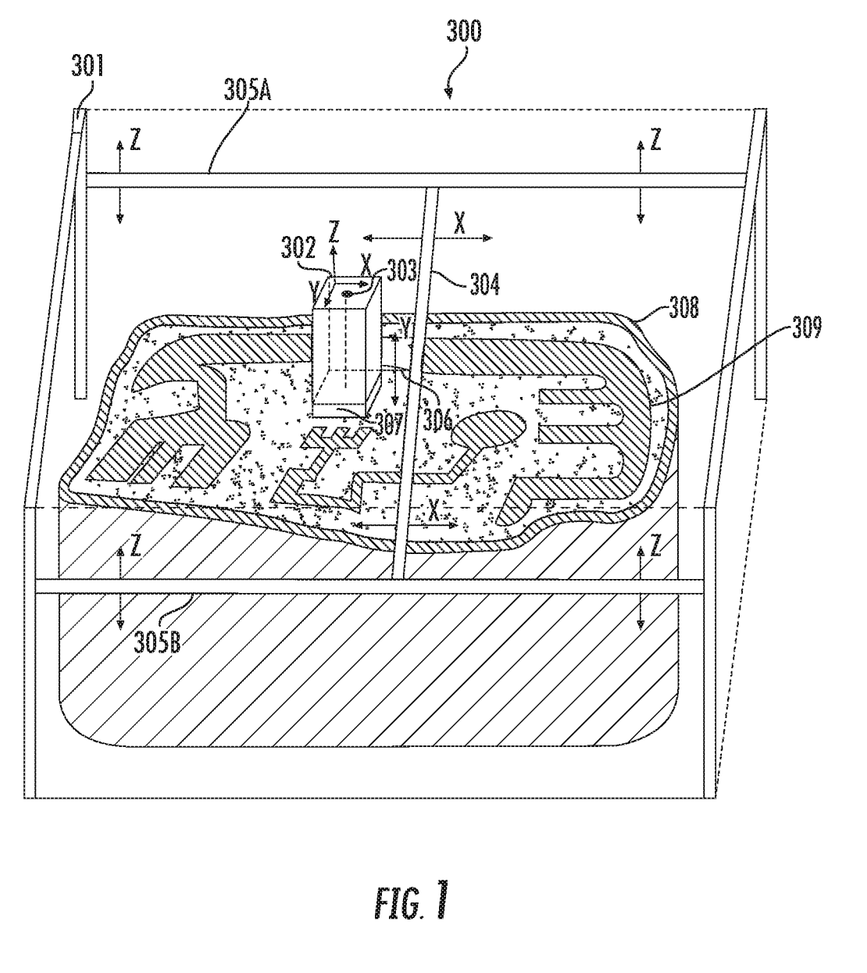
FIG. 1 shows a large scale additive manufacturing apparatus according to an embodiment of the invention.

FIG. 1 shows an example of one embodiment of a large-scale additive manufacturing apparatus 300 according to the present invention. The apparatus 300 comprises a positioning system 301, a build unit 302 comprising an irradiation emission directing device 303, a laminar gas flow zone 307, and a build plate (not shown in this view) beneath an object being built 309. The maximum build area is defined by the positioning system 301, instead of by a powder bed as with conventional systems, and the build area for a particular build can be confined to a build envelope 308 that may be dynamically built up along with the object. The gantry 301 has an x crossbeam 304 that moves the build unit 302 in the x direction. There are two z crossbeams 305A and 305B that move the build unit 302 and the x crossbeam 304 in the z direction. The x cross beam 304 and the build unit 302 are attached by a mechanism 306 that moves the build unit 302 in the y direction. In this illustration of one embodiment of the invention, the positioning system 301 is a gantry, but the present invention is not limited to using a gantry. In general, the positioning system used in the present invention may be any multidimensional positioning system such as a delta robot, cable robot, robot arm, etc. The irradiation emission directing device 303 may be independently moved inside of the build unit 302 by a second positioning system (not shown). The atmospheric environment outside the build unit, i.e. the "build environment," or "containment zone," is typically controlled such that the oxygen content is reduced relative to typical ambient air, and so that the environment is at reduced pressure.

There may also be an irradiation source that, in the case of a laser source, originates the photons comprising the laser beam irradiation is directed by the irradiation emission directing device. When the irradiation source is a laser source, then the irradiation emission directing device may be, for example, a galvo scanner, and the laser source may be located outside the build environment. Under these circumstances, the laser irradiation may be transported to the irradiation emission directing device by any suitable means, for example, a fiber-optic cable. According to an exemplary embodiment, irradiation emission directing device uses an optical control unit for directing the laser beam. An optical control unit may comprise, for example, optical lenses, deflectors, mirrors, and/or beam splitters. Advantageously, a telocentric lens may be used. When a large-scale additive manufacturing apparatus according to an embodiment of the present invention is in operation, if the irradiation emission directing devices directs a laser beam, then generally it is advantageous to include a gasflow device providing substantially laminar gas flow to a gasflow zone as illustrated in FIG. 1, 307 and FIG. 2, 404.

When the irradiation source is an electron source, then the electron source originates the electrons that comprise the e-beam that is directed by the irradiation emission directing device. An e-beam is a well-known source of irradiation. When the source is an electron source, then it is important to maintain sufficient vacuum in the space through which the e-beam passes. Therefore, for an e-beam, there is no gas flow across the gasflow zone (shown, for example at FIG. 1, 307). When the irradiation source is an electron source, then the irradiation emission directing device may be, for example, an electronic control unit which may comprise, for example, deflector coils, focusing coils, or similar elements.

The apparatus 300 allows for a maximum angle of the beam to be a relatively small angle $\theta_2$ to build a large part, because (as illustrated in FIG. 1) the build unit 302 can be moved to a new location to build a new part of the object being formed 309. When the build unit is stationary, the point on the powder that the energy beam touches when $\theta_2$ is 0 defines the center of a circle in the xy plane (the direction of the beam when $\theta_2$ is approximately 0 defines the z direction), and the most distant point from the center of the circle where the energy beam touches the powder defines a point on the outer perimeter of the circle. This circle defines the beam's scan area, which may be smaller than the smallest cross sectional area of the object being formed (in the same plane as the beam's scan area). There is no particular upper limit on the size of the object relative to the beam's scan area.

In some embodiments, the recoater used is a selective recoater. One embodiment is illustrated in FIGS. 2 through 5.

Figure 2:
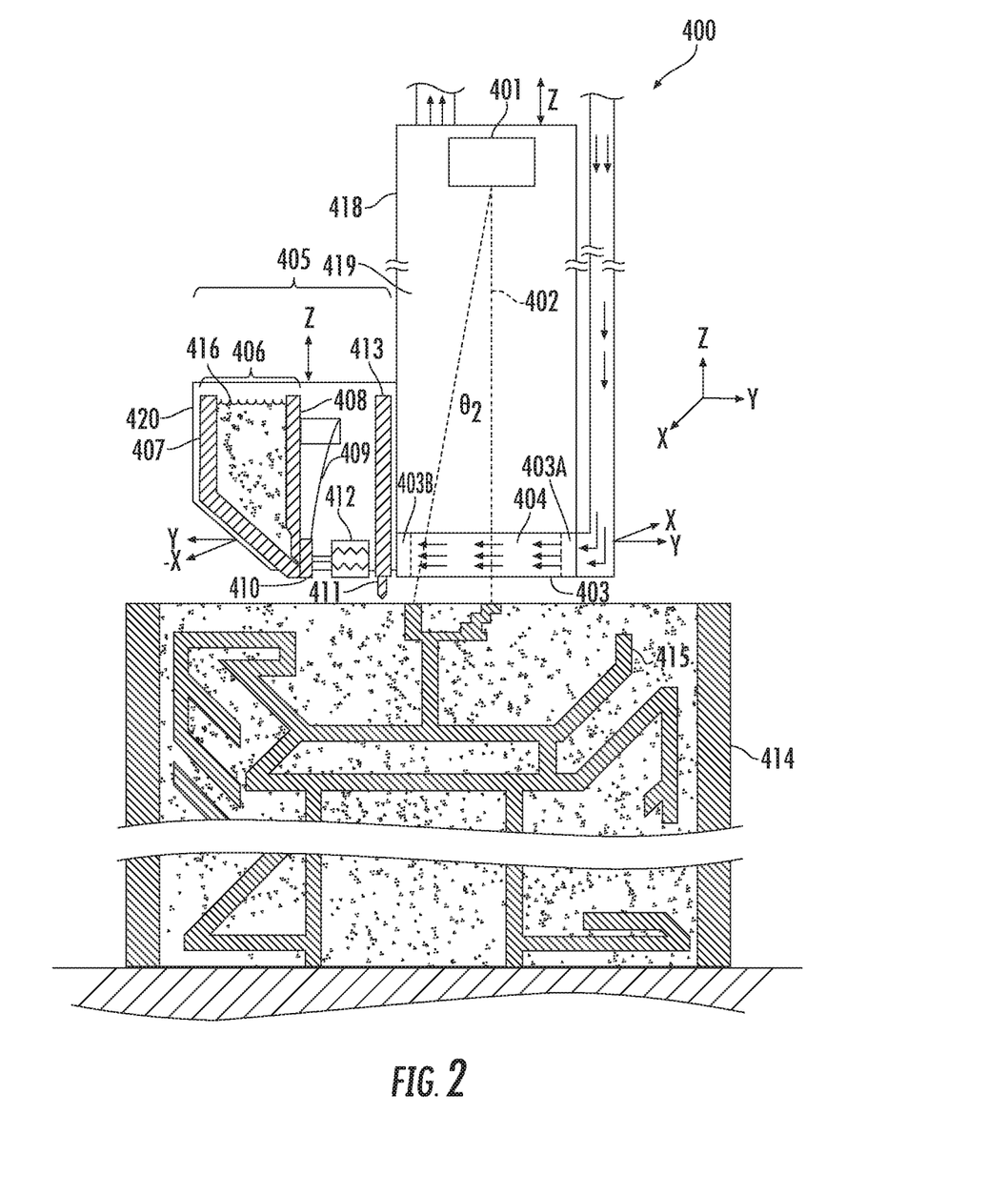
FIG. 2 shows a side view of a build unit according to an embodiment of the invention.

FIG. 2 shows a build unit 400 comprising an irradiation emission directing device 401, a gasflow device 403 with a pressurized outlet portion 403A and a vacuum inlet portion 403B providing gas flow to a gasflow zone 404, and a recoater 405. Above the gasflow zone 404 there is an enclosure 418 containing an inert environment 419. The recoater 405 has a hopper 406 comprising a back plate 407 and a front plate 408. The recoater 405 also has at least one actuating element 409, at least one gate plate 410, a recoater blade 411, an actuator 412, and a recoater arm 413. The recoater is mounted to a mounting plate 420. FIG. 2 also shows a build envelope 414 that may be built by, for example, additive manufacturing or Mig/Tig welding, an object being formed 415, and powder 416 contained in the hopper 405 used to form the object 415. In this particular embodiment, the actuator 412 activates the actuating element 409 to pull the gate plate 410 away from the front plate 408. In an embodiment, the actuator 412 may be, for example, a pneumatic actuator, and the actuating element 409 may be a bidirectional valve. In an embodiment, the actuator 412 may be, for example, a voice coil, and the actuating element 409 may be a spring. There is also a hopper gap 417 between the front plate 408 and the back plate 407 that allows powder to flow when a corresponding gate plate is pulled away from the powder gate by an actuating element. The powder 416, the back plate 407, the front plate 408, and the gate plate 410 may all be the same material. Alternatively, the back plate 407, the front plate 408, and the gate plate 410 may all be the same material, and that material may be one that is compatible with the powder material, such as cobalt-chrome. In this particular embodiment, the gas flow in the gasflow zone 404 flows in the y direction, but it does not have to. The recoater blade 411 has a width in the x direction. The direction of the irradiation emission beam when $\theta_2$ is approximately 0 defines the z direction in this view. The gas flow in the gasflow zone 404 may be substantially laminar. The irradiation emission directing device 401 may be independently movable by a second positioning system (not shown). FIG. 2 shows the gate plate 410 in the closed position.

Figure 3:
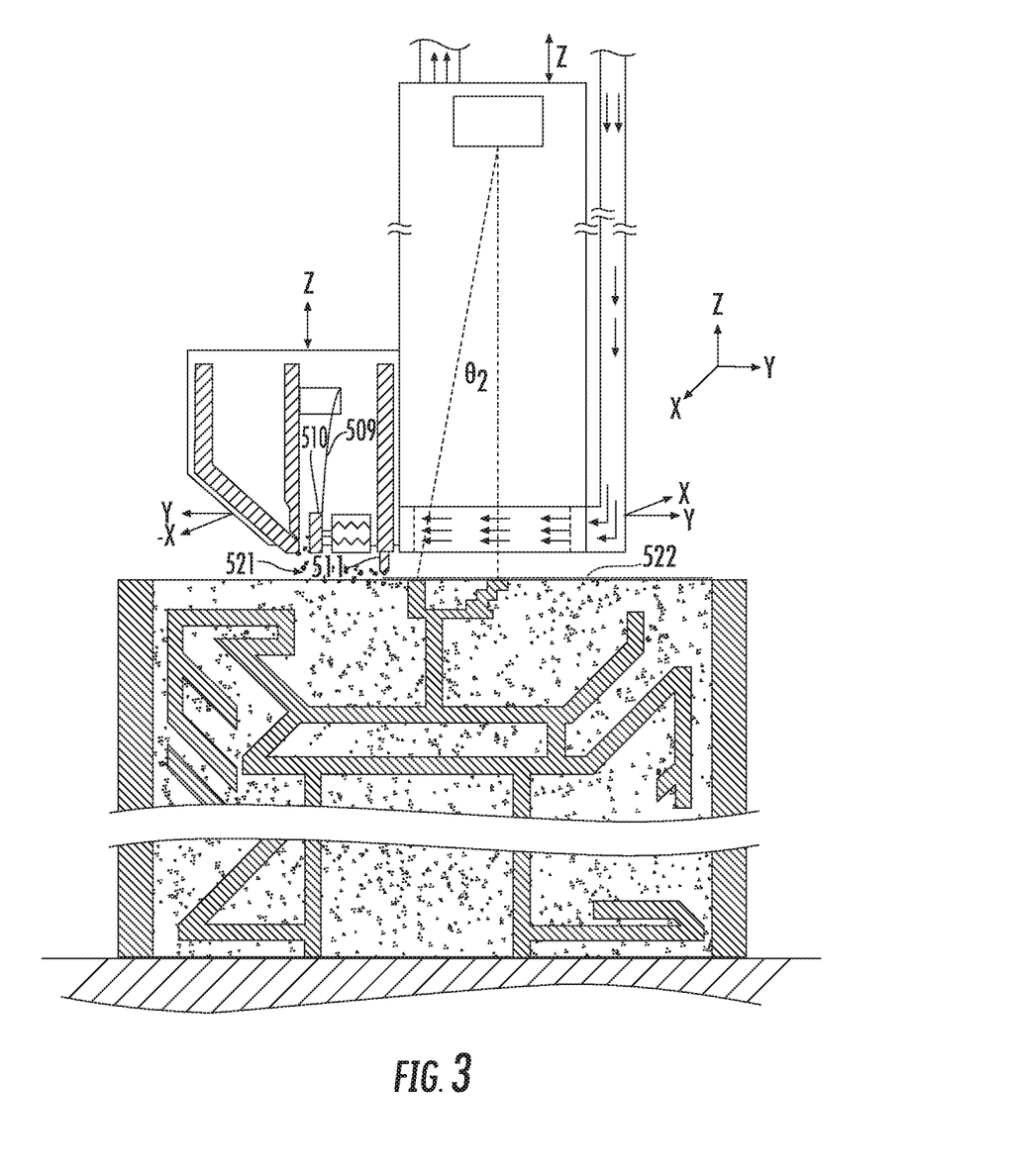
FIG. 3 shows a side view of a build unit dispensing powder according to an embodiment of the invention.

FIG. 3 shows the build unit of FIG. 2, with the gate plate 410 in the open position (as shown by element 510) and actuating element 509. Powder in the hopper is deposited to make fresh powder layer 521, which is smoothed over by the recoater blade 511 to make a substantially even powder layer 522. In some embodiments, the substantially even powder layer may be irradiated at the same time that the build unit is moving, which would allow for continuous operation of the build unit and thus faster production of the object.

Figure 4:
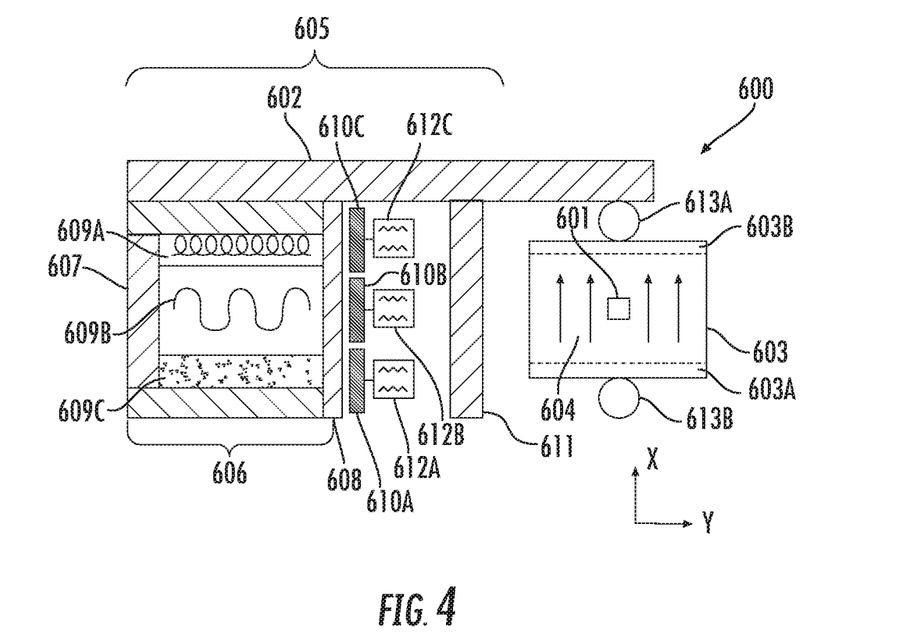
FIG. 4 shows a top view of a build unit according to an embodiment of the invention.

FIG. 4 shows a top down view of the build unit of FIG. 2. For simplicity, the object and the walls are not shown here. The build unit 600 has an irradiation emission directing device 601, an attachment plate 602 attached to the gasflow device 603, hopper 606, and recoater arm 611. The gasflow device has a gas outlet portion 603A and a gas inlet portion 603B. Within the gasflow device 603 there is a gasflow zone 604. The gasflow device 603 provides laminar gas flow within the gasflow zone 604. There is also a recoater 605 with a recoater arm 611, actuating elements 612A, 612B, and 612C, and gate plates 610A, 610B, and 610C. The recoater 605 also has a hopper 606 with a back plate 607 and front plate 608. In this particular illustration of one embodiment of the present invention, the hopper is divided into three separate compartments containing three different materials 609A, 609B, and 609C. There are also gas pipes 613A and 613B that feed gas out of and into the gasflow device 603.

Figure 5:
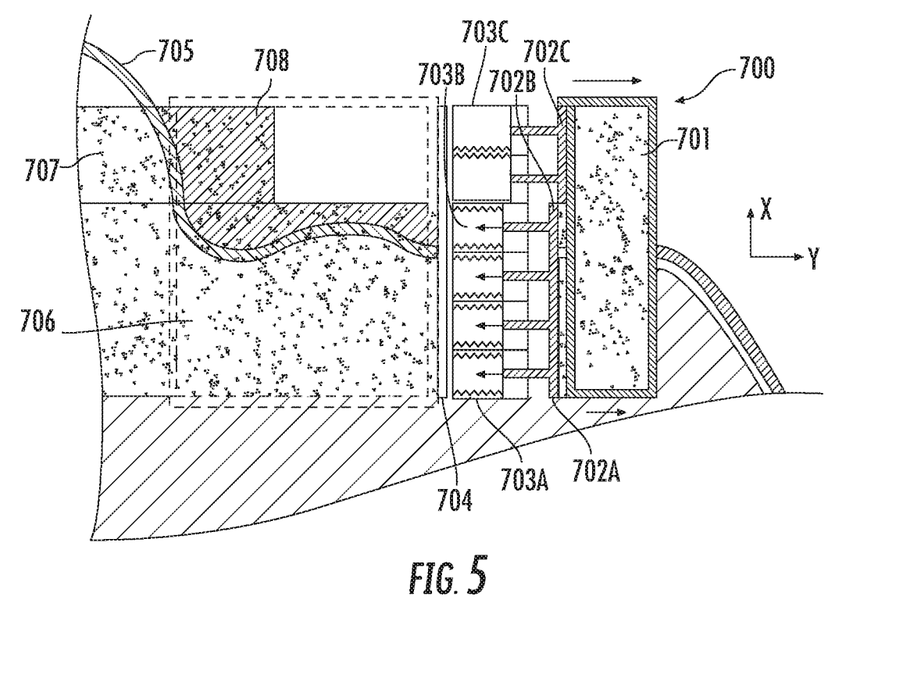
FIG. 5 shows a top view of a recoater according to an embodiment of the present invention.

FIG. 5 shows a top down view of a recoater according to one embodiment, where the recoater has a hopper 700 with only a single compartment containing a powder material 701. There are three gate plates 702A, 702B, and 702C that are controlled by three actuating elements 703A, 703B, and 703C. There is also a recoater arm 704 and a wall 705. When the recoater passes over a region that is within the wall, such as indicated by 707, the corresponding gate plate 702C may be held open to deposit powder in that region 707. When the recoater passes over a region that is outside of the wall, such as the region indicated as 708, the corresponding gate plate 702C is closed by its corresponding actuating element 703C, to avoid depositing powder outside the wall, which could potentially waste the powder. Within the wall 705, the recoater is able to deposit discrete lines of powder, such as indicated by 706. The recoater blade (not shown in this view) smooths out the powder deposited.

Advantageously, a selective recoater according to embodiments of the apparatus and methods described herein allows precise control of powder deposition using powder deposition device (e.g. a hopper) with independently controllable powder gates as illustrated, for example, in FIG. 4, 606, 610A, 610B, and 610C and FIG. 5, 702A, 702B, and 702C. The powder gates are controlled by at least one actuating element which may be, for instance, a bidirectional valve or a spring (as illustrated, for example, in FIG. 2, 409. Each powder gate can be opened and closed for particular periods of time, in particular patterns, to finely control the location and quantity of powder deposition (see, for example, FIG. 4). The hopper may contain dividing walls so that it comprises multiple chambers, each chamber corresponding to a powder gate, and each chamber containing a particular powder material (see, for example, FIG. 4, and 609A, 609B, and 609C). The powder materials in the separate chambers may be the same, or they may be different. Advantageously, each powder gate can be made relatively small so that control over the powder deposition is as fine as possible. Each powder gate has a width that may be, for example, no greater than about 2 inches, or more preferably no greater than about ¼ inch. In general, the smaller the powder gate, the greater the powder deposition resolution, and there is no particular lower limit on the width of the powder gate. The sum of the widths of all powder gates may be smaller than the largest width of the object, and there is no particular upper limit on the width of the object relative to the sum of the widths of the power gates.

Advantageously, a simple on/off powder gate mechanism according to one embodiment is simpler and thus less prone to malfunctioning. It also advantageously permits the powder to come into contact with fewer parts, which reduces the possibility of contamination. Advantageously, a recoater according to an embodiment of the present invention can be used to build a much larger object. For example, the largest xy cross sectional area of the recoater may be smaller than the smallest cross sectional area of the object, and there is no particular upper limit on the size of the object relative to the recoater. Likewise, the width of the recoater blade may smaller than the smallest width of the object, and there is no particular upper limit on the width of the object relative to the recoater blade. After the powder is deposited, a recoater blade can be passed over the powder to create a substantially even layer of powder with a particular thickness, for example about 50 microns, or preferably about 30 microns, or still more preferably about 20 microns. Another feature of some embodiments of the present invention is a force feedback loop. There can be a sensor on the selective recoater that detects the force on the recoater blade. During the manufacturing process, if there is a time when the expected force on the blade does not substantially match the detected force, then control over the powder gates may be modified to compensate for the difference. For instance, if a thick layer of powder is to be provided, but the blade experiences a relatively low force, this scenario may indicate that the powder gates are clogged and thus dispensing powder at a lower rate than normal. Under these circumstances, the powder gates can be opened for a longer period of time to deposit sufficient powder. On the other hand, if the blade experiences a relatively high force, but the layer of powder provided is relatively thin, this may indicate that the powder gates are not being closed properly, even when the actuators are supposed to close them. Under these circumstances, it may be advantageous to pause the build cycle so that the system can be diagnosed and repaired, so that the build may be continued without comprising part quality. Another feature of some embodiments of the present invention is a camera for monitoring the powder layer thickness. Based on the powder layer thickness, the powder gates can be controlled to add more or less powder.

In addition, an apparatus according to an embodiment of the present invention may have a controlled low oxygen build environment with two or more gas zones to facilitate a low oxygen environment. The first gas zone is positioned immediately over the work surface. The second gas zone may be positioned above the first gas zone, and may be isolated from the larger build environment by an enclosure. For example, in FIG. 2 element 404 constitutes the first gas zone, element 419 constitutes the second gas zone contained by the enclosure 418, and the environment around the entire apparatus is the controlled low oxygen build environment. In the embodiment illustrated in FIG. 2, the first gasflow zone 404 is essentially the inner volume of the gasflow device 403, i.e. the volume defined by the vertical (xz plane) surfaces of the inlet and outlet portions (403A and 403B), and by extending imaginary surfaces from the respective upper and lower edges of the inlet portion to the upper and lower edges of the outlet portion in the xy plane. When the irradiation emission directing device directs a laser beam, then the gasflow device preferably provides substantially laminar gas flow across the first gas zone. This facilitates removal of the effluent plume caused by laser melting. Accordingly, when a layer of powder is irradiated, smoke, condensates, and other impurities flow into the first gasflow zone, and are transferred away from the powder and the object being formed by the laminar gas flow. The smoke, condensates, and other impurities flow into the low-pressure gas outlet portion and are eventually collected in a filter, such as a HEPA filter. By maintaining laminar flow, the aforementioned smoke, condensates and other impurities can be efficiently removed while also rapidly cooling melt pool(s) created by the laser, without disturbing the powder layer, resulting in higher quality parts with improved metallurgical characteristics. In an aspect, the gas flow in the gasflow volume is at about 3 meters per second. The gas may flow in either the x or y direction.

The oxygen content of the second controlled atmospheric environment is generally approximately equal to the oxygen content of the first controlled atmospheric environment, although it doesn't have to be. The oxygen content of both controlled atmospheric environments is preferably relatively low. For example, it may be 1% or less, or more preferably 0.5% or less, or still more preferably 0.1% or less. The non-oxygen gases may be any suitable gas for the process. For instance, nitrogen obtained by separating ambient air may be a convenient option for some applications. Some applications may use other gases such as helium, neon, or argon. An advantage of the invention is that it is much easier to maintain a low-oxygen environment in the relatively small volume of the first and second controlled atmospheric environments. In prior art systems and methods, the larger environment around the entire apparatus and object must be tightly controlled to have a relatively low oxygen content, for instance 1% or less. This can be time-consuming, expensive, and technically difficult. Thus it is preferable that only relatively smaller volumes require such relatively tight atmospheric control. Therefore, in the present invention, the first and second controlled atmospheric environments may be, for example, 100 times smaller in terms of volume than the build environment. The first gas zone, and likewise the gasflow device, may have a largest xy cross sectional area that is smaller than the smallest cross sectional area of the object. There is no particular upper limit on the size of the object relative to the first gas zone and/or the gasflow device. Advantageously, the irradiation emission beam (illustrated, for example, as 402 and 502) fires through the first and second gas zones, which are relatively low oxygen zones. And when the first gas zone is a laminar gasflow zone with substantially laminar gas flow, the irradiation emission beam is a laser beam with a more clear line of sight to the object, due to the aforementioned efficient removal of smoke, condensates, and other contaminants or impurities.

One advantage of the present invention is that, in some embodiments, the build plate may be vertically stationary (i.e. in the z direction). This permits the build plate to support as much material as necessary, unlike the prior art methods and systems, which require some mechanism to raise and lower the build plate, thus limiting the amount of material that can be used. Accordingly, the apparatus of the present invention is particularly suited for manufacturing an object within a large (e.g., greater than 1 m$^3$) build envelope. For instance, the build envelope may have a smallest xy cross sectional area greater than 500 mm$^2$, or preferably greater than 750 mm$^2$, or more preferably greater than 1 m$^2$. The size of the build envelope is not particularly limited. For instance, it could have a smallest cross sectional area as large as 100 m$^2$. Likewise, the formed object may have a largest xy cross sectional area that is no less than about 500 mm$^2$, or preferably no less than about 750 mm$^2$, or still more preferably no less than about 1 m$^2$. There is no particular upper limit on the size of the object. For example, the object's smallest xy cross sectional area may be as large as 100 m². Because the build envelope retains unfused powder about the object, it can be made in a way that minimizes unfused powder (which can potentially be wasted powder) within a particular build, which is particularly advantageous for large builds. When building large objects within a dynamically grown build envelope, it may be advantageous to build the envelope using a different build unit, or even a different build method altogether, than is used for the object. For example, it may be advantageous to have one build unit that directs an e-beam, and another build unit that directs a laser beam. With respect to the build envelope, precision and quality of the envelope may be relatively unimportant, such that rapid build techniques are advantageously used. In general, the build envelope may be built by any suitable means, for instance by Mig or Tig welding, or by laser powder deposition. If the wall is built by additive manufacturing, then a different irradiation emission directing device can be used to build than wall than is used to build the object. This is advantageous because building the wall may be done more quickly with a particular irradiation emission directing device and method, whereas a slower and more accurate directing device and method may be desired to build the object. For example, the wall may be built from a rapidly built using a different material from the object, which may require a different build method. Ways to tune accuracy vs. speed of a build are well known in the art, and are not recited here.

Figure 6:
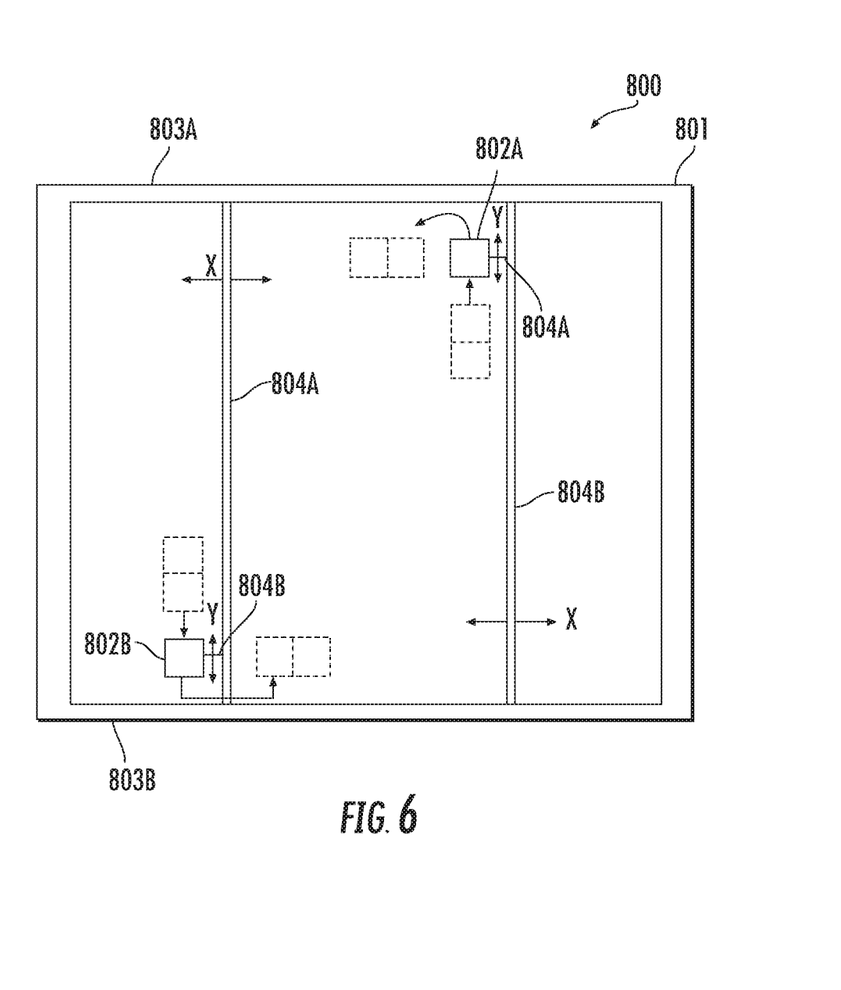
FIG. 6 illustrates a large scale additive manufacturing apparatus with two build units according to an embodiment of the present invention.

For example, as shown in FIG. 6, the systems and methods of the present invention may use two or more build units to build one or more object(s). The number of build units, objects, and their respective sizes are only limited by the physical spatial configuration of the apparatus. FIG. 6 shows a top down view of a large-scale additive manufacturing machine 800 according to an embodiment of the invention. There are two build units 802A and 802B mounted to a positioning system 801. There are z crossbeams 803A and 803B for moving the build units in the z direction. There are x crossbeams 804A and 804B for moving the build units in the x direction. The build units 802A and 802B are attached to the x crossbeams 804A and 804B by mechanisms 805A and 805B that move the units in the y direction. The object(s) being formed are not shown in this view. A build envelope (also not shown in this view) can be built using one or both of the build units, including by laser powder deposition. The build envelope could also be built by, e.g., welding. In general, any number of objects and build envelopes can be built simultaneously using the methods and systems of the present invention.

Figure 7:
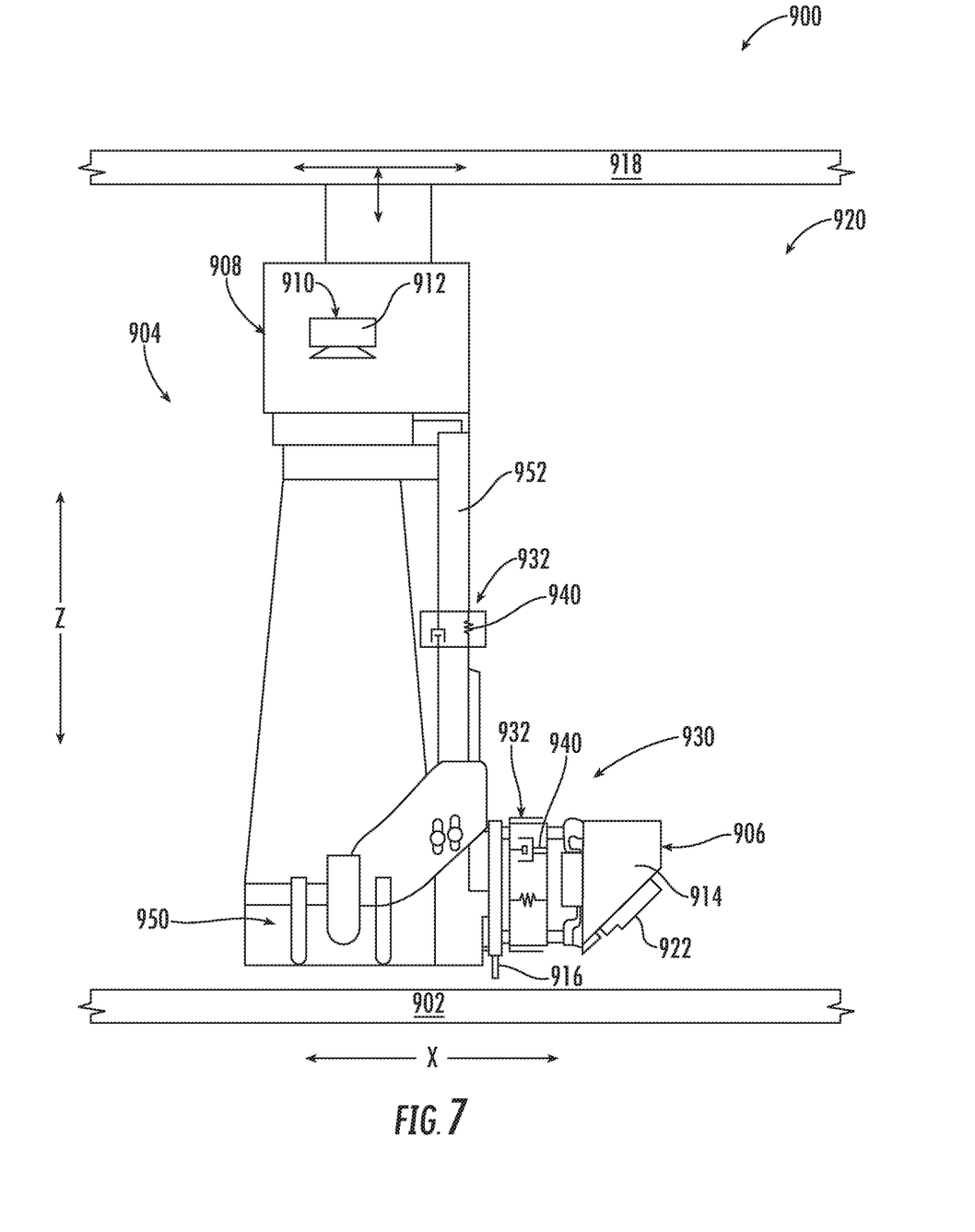
FIG. 7 illustrates a schematic view of a build unit equipped with a passive vibration isolation device according to an embodiment of the present invention.
Figure 8:
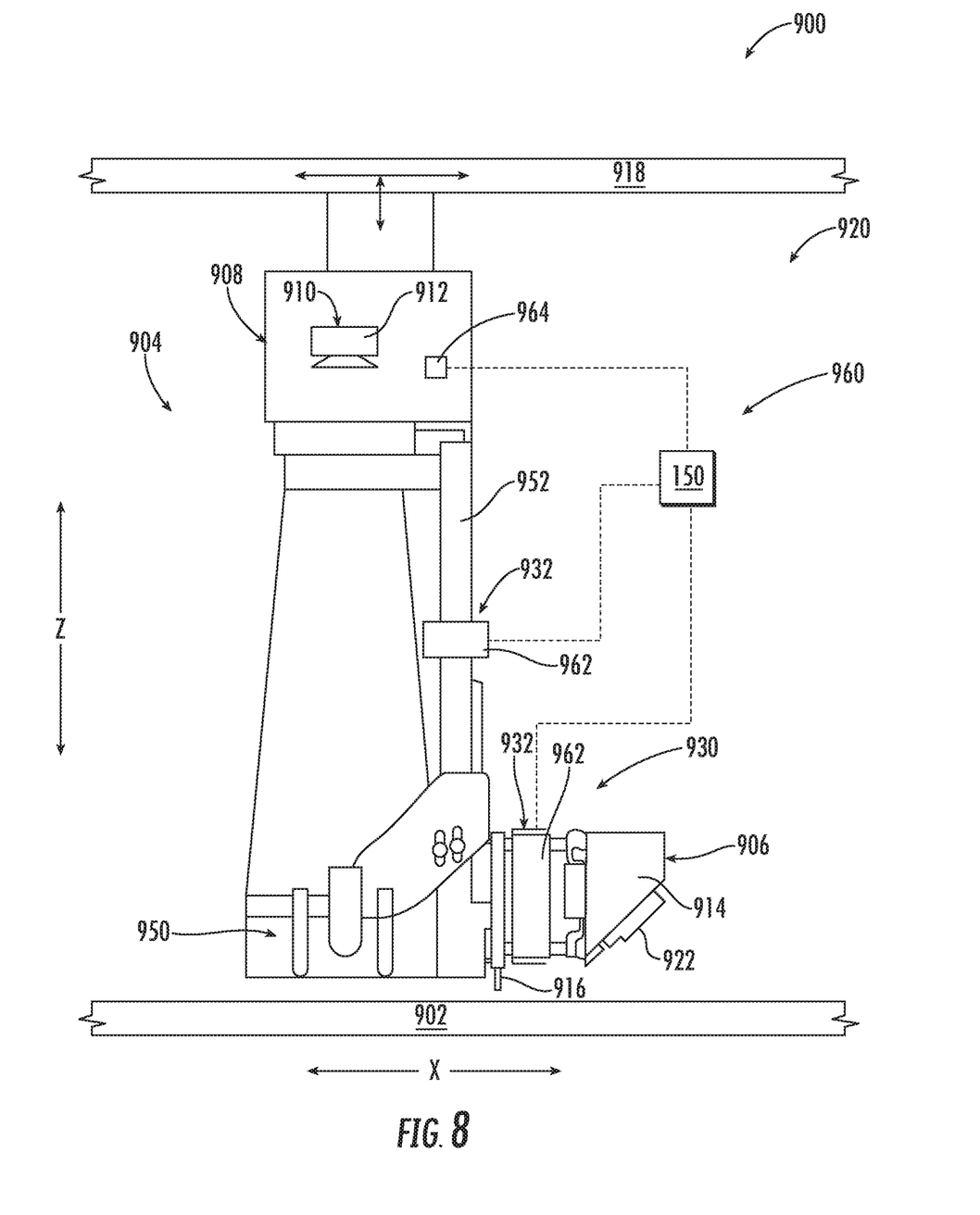
FIG. 8 illustrates a schematic view of a build unit equipped with an active vibration isolation device according to an embodiment of the present invention.

Referring now to FIGS. 7 and 8, an additive manufacturing machine 900 generally defines a vertical or Z-direction and a horizontal plane defined perpendicular to the Z-direction (also as defined, e.g., by the X-direction and the Y-direction in FIG. 1). Build platform 902 extends within the horizontal plane to provide a surface for depositing layers of additive powder (not shown in FIGS. 7 and 8), as described herein. In general, additive manufacturing machine 900 includes a build unit 904 that is generally used for depositing a layer of additive powder and fusing portions of the layer of additive powder to form a single layer of a component (not illustrated in FIGS. 7 and 8). As described above, build unit 904 forms the component layer-by-layer by printing or fusing layers of additive powder as build unit 904 moves up along the vertical direction.

Build unit 904 generally includes a powder dispenser 906 for discharging a layer of additive powder and a scan unit 908 including a powder fusing device 910 for fusing or bonding a portion of that layer of powder. More specifically, for a direct metal laser sintering or melting machine, powder fusing device 910 may be an energy source 912 for selectively directing energy toward the layer of additive powder to fuse portions of the layer of additive powder. In addition, "energy source" may be used to refer to any device or system of devices configured for directing an energy beam towards a layer of additive powder to fuse a portion of that layer of additive powder. For example, according to an exemplary embodiment, energy source may be an irradiation emission directing device, as described above. According to an exemplary embodiment, powder dispenser 906 may further include a powder hopper 914, a system of gates (see, e.g., FIG. 4, 610A-C and FIG. 5, 702A-C), a recoater arm 916, and any other components which facilitate the deposition of smooth layers of additive powder on build platform 902 or a sub layer.

As described above, build unit 904 is described as utilizing a direct metal laser sintering (DMLS) or direct metal laser melting (DMLM) process using an energy source to selectively sinter or melt portions of a layer of powder. However, it should be appreciated that according to alternative embodiments, additive manufacturing machine 900 and build unit 904 may be configured for using a "binder jetting" process of additive manufacturing. In this regard, binder jetting involves successively depositing layers of additive powder in a similar manner as described above. However, instead of using energy source 912 to generate an energy beam to selectively melt or fuse the additive powders, binder jetting involves selectively depositing a liquid binding agent onto each layer of powder. Thus, for example, powder fusing device 910 may be a binder jet head for depositing binding agent. The liquid binding agent may be, for example, a photo-curable polymer or another liquid bonding agent. Other suitable additive manufacturing methods and variants are intended to be within the scope of the present subject matter.

Notably, according aspects of the present subject matter, build unit 904 is supported by a gantry 918 that is positioned above build platform 902 and at least partially defines a build area 920. Notably, as used herein, "gantry" 918 may be intended to refer to the horizontally extending support beams and not the vertical support legs (not shown) that support the gantry 918 over the build platform 902. Although a gantry 918 is used to describe the support for build unit 904 herein, it should be appreciated that any suitable vertical support means can be used according to alternative embodiments. For example, build unit 904 may be attached to a positioning system such as a delta robot, a cable robot, a robot arm, a belt drive, etc. In addition, although build platform 902 is illustrated herein as being stationary, it should be appreciated that build platform 902 may move according to alternative embodiments. In this regard, for example build platform 902 may be configured for translating along the X-Y-Z directions or may rotate about one of these axes.

According to the illustrated embodiment, gantry 918 defines a build area 920 having a maximum build width (e.g., measured along the X-direction), build depth (e.g., measured along the Y-direction), and build height (measured along the vertical direction or Z-direction). Gantry 918 is generally configured for movably supporting build unit 904 within build area 920, e.g., such that build unit 904 may be positioned at any location (e.g., along X-Y-Z axes) within build area 920. Moreover, according to exemplary embodiments, gantry 918 may further be configured for rotating build unit about the X, Y, and Z axes. Thus, build unit 904 may be positioned and oriented in any suitable manner within build area 920 to perform an additive manufacturing process.

As explained briefly above, powder dispenser 906 may include a vibration source 922 to facilitate the dispensing of additive powder from hopper 914. In this regard, for example, vibration source 922 may be attached to hopper 914 and may be configured for continuously or intermittently vibrating hopper 914 to dislodge any powder clogged in the gates, break up any clumps of additive powders, or otherwise facilitate the continuous and smooth deposit of additive powders. Vibration source 922 may be a motor driven oscillator, a motor with an unbalanced mass on its driveshaft, or any other suitable mechanism for vibrating powder dispenser 906 and the hopper 914.

However, because powder dispenser 906 is suspended from scan unit 908, vibrations from powder dispenser 906 may have a tendency of transmitting to or reverberating through to scan unit 908. Notably, given the extremely precise manufacturing tolerances associated with additive manufacturing machine 900 (e.g., as small as 10 µm or smaller according to exemplary embodiments), even a slight vibration in scan unit 908, and thus energy source 912, can cause serious performance and/or operational issues with additive manufacturing machine 900. In order to improve the operation of energy source 912 and the printing resolution of build unit 904, a system for damping, eliminating, or otherwise compensating for vibrations within build unit 904 is described below.

Referring still to FIGS. 7 and 8, build unit 904 may further include a vibration isolation system 930 which is generally configured for minimizing vibrations within scan unit 908. In this regard, for example, vibration isolation system 930 may be intended to prevent the propagation or transmittal of vibrations generated by vibration source 922 from affecting the accuracy of scan unit 908 and energy source 912. Several exemplary configurations of vibration isolation system 930 are described below. However, it should be appreciated that these configurations are only exemplary and are not intended to limit the scope of the present subject matter. Indeed, any suitable device or system configured for isolating scan unit 908 from powder dispenser 906, for damping vibrations, or for otherwise minimizing the effects of vibrations upon the performance of scan unit 908 are contemplated as within the scope of the present subject matter.

According to the illustrated embodiment, vibration isolation system 930 includes a vibration isolation device 932 that is positioned between and couples powder dispenser 906 to scan unit 908. In this regard, as illustrated, powder dispenser 906 is coupled to scan unit 908 through vibration isolation device 932 such that powder dispenser 906 is supported in a cantilevered manner relative to scan unit 908. According to an alternative embodiment of the present subject matter, powder dispenser 906 may be supported directly by gantry 918 and/or moved using a separate motion system.

Notably, vibration isolation device 932 may be an active or a passive device. As used herein, an "active" device (e.g., see FIG. 8) generally includes a power source or other component configured for injecting a net energy input into the system, e.g., to compensate for the vibration energy generated by vibration source 922. By contrast, a "passive" device (e.g., see FIG. 7) does not introduce a net energy into the system, e.g., such that it may only absorb, dissipate, or redirect vibrational energy generated by vibration source 922, but may not generate new vibrational energy. Examples of active and passive devices are described below for purposes explanation. However, it should be appreciated that these devices are only exemplary and are not intended to limit the scope of the present subject matter.

Referring now to FIG. 7, an embodiment of vibration isolation system 930 is described where vibration isolation device 932 is a passive coupling member 940. For example, passive coupling member 940 may be a rubber pad or a plurality of rubber pads that are configured for isolating scan unit 908 from powder dispenser 906. According to another embodiment, passive coupling member 940 may be a spring-damper system configured for absorbing vibrations generated by vibration source 922. It should be appreciated that passive coupling member 940 may be any other suitable device, mechanism, or system that is configured for absorbing vibrational energy generated by vibration source 922.

As explained above, vibration isolation system 930 may include one or more vibration isolation devices 932 positioned at any suitable location within build unit 904 for absorbing vibrations that might otherwise affect the performance of the energy source 912. For example, referring still FIG. 7, a first vibration isolation device 932 may be positioned between scan unit 908 and powder dispenser 906. More specifically, the first vibration isolation device 932 is positioned between recoater arm 916 and hopper 914. In this manner, recoater arm 916 is also isolated from vibrations generated by vibration source 922 such that it may smoothly and evenly spread the layer of additive powder dispensed from hopper 914.

In addition, vibration isolation system 930 may further include a second vibration isolation device 932. For example, according to the illustrated embodiment, scan unit 908 further includes a gas flow device 950 (e.g., such as gasflow device 403 in FIG. 2). Gasflow device 950 is generally configured for providing a substantially laminar flow of gas proximate a work surface, e.g., for evacuating byproducts of the additive manufacturing process. Gas flow device 950 is positioned below powder fusing device 910 and may be coupled to powder fusing device 910 through a vertical support beam 952. To further isolate powder fusing device 910 from vibrations generated by vibration source 922, the second vibration isolation device 932 may be positioned on vertical support beam 952, may couple a top and a bottom portion of vertical support beam 952, or may otherwise provide vibration suppression to vertical support beam 952.

Referring now to FIG. 8, vibration isolation device 932 is an active vibration canceling system 960. In this regard, active vibration canceling system 960 may include a vibrating mechanism 962 for inducing counteracting vibrations in scan unit 908. For example, vibrating mechanism 962 may include a motor for oscillating a mass or include a driveshaft having an imbalanced mass for generating vibrations. The vibrations generated by vibrating mechanism 962 may be generated to counteract vibrations generated by vibration source 922. In other words, vibrating mechanism 962 cancels or damps vibrations generated by vibration source 922 and acts to create destructive interference to such vibrations such that scan unit 908 experiences lower levels vibration.

Active vibration canceling system 960 may further include a vibration sensor 964 operably coupled to the scan unit 908 for detecting vibrations induced by vibration source 922. A control system (such as control system 150, which will be described below in reference to FIG. 9) may be used to control vibrating mechanism 962 to counteract such vibrations. Although vibration sensor 964 is illustrated as being coupled to scan unit 908 directly, it should be appreciated that vibration sensor 964 could be positioned at any suitable location on or within build unit 904 for detecting system vibrations in determining suitable corrective vibrations by vibrating mechanism 962. Similarly, vibrating mechanism 962 may be positioned at any suitable location where it may counteract vibrations generated by vibration source 922. Other configurations will be apparent to those skilled in the art and are contemplated as within the scope of the present subject matter.

As illustrated in FIGS. 7 and 8, build unit 904 includes two vibration isolation devices 932. The first vibration isolation device 932 is positioned between powder dispenser 906 and scan unit 908. The second vibration isolation device 932 is positioned within scan unit 908, e.g., between powder fusing device 910 and gas flow device 950. However, it should be appreciated that according to alternative embodiments, one or more than two vibration isolation devices 932 may be positioned at any suitable location within build unit 904 in order to damp vibrations generated by vibration source 922. In addition, it should be appreciated that build unit 904 may use passive vibration isolation devices such as passive coupling members 940, active vibration isolation devices such as active vibration canceling system 960, or any suitable combination thereof.

Figure 9:
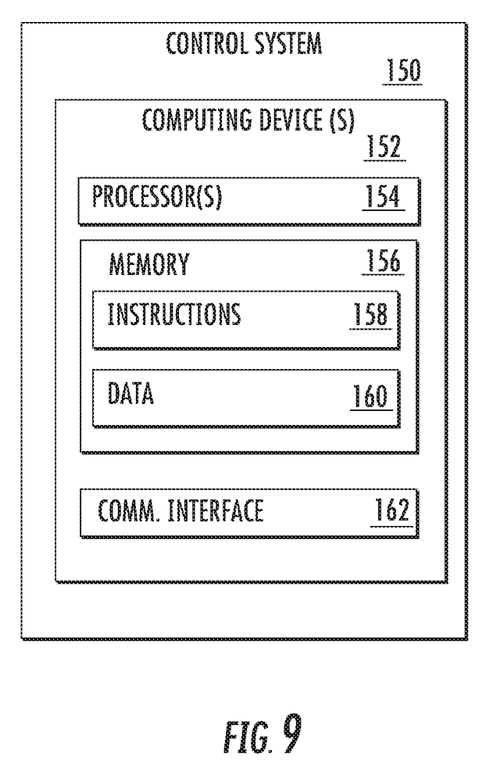
FIG. 9 shows an exemplary control system for use with an additive manufacturing machine and vibration isolation device according to an embodiment of the invention.

FIG. 9 depicts a block diagram of an example control system 150 that can be used to implement methods and systems according to example embodiments of the present disclosure, particularly the operation of additive manufacturing machine 900 and vibration isolation system 930. In this regard, for example, control system 150 may be configured for regulating the vibration of active vibration canceling system 960. Specifically, according to the illustrated embodiment, control system 150 is operably coupled to vibration sensor 964 for detecting vibration within scan unit 908 or elsewhere within build unit 904. Control system 150 may determine suitable corrective vibrations and vibrating mechanism 962 to generate such vibrations. Control system 150 may be a dedicated controller of vibration isolation system 930 or may be a primary controller of additive manufacturing machine 900. The control system 150 may be positioned in a variety of locations throughout additive manufacturing machine 900.

As shown, the control system 150 can include one or more computing device(s) 152. The one or more computing device(s) 152 can include one or more processor(s) 154 and one or more memory device(s) 156. The one or more processor(s) 154 can include any suitable processing device, such as a microprocessor, microcontroller, integrated circuit, logic device, or other suitable processing device. The one or more memory device(s) 156 can include one or more computer-readable media, including, but not limited to, non-transitory computer-readable media, RAM, ROM, hard drives, flash drives, or other memory devices.

The one or more memory device(s) 156 can store information accessible by the one or more processor(s) 154, including computer-readable instructions 158 that can be executed by the one or more processor(s) 154. The instructions 158 can be any set of instructions that when executed by the one or more processor(s) 154, cause the one or more processor(s) 154 to perform operations. The instructions 158 can be software written in any suitable programming language or can be implemented in hardware. In some embodiments, the instructions 158 can be executed by the one or more processor(s) 154 to cause the one or more processor(s) 154 to perform operations, such as the operations for controlling vibration isolation system 930 or otherwise operating additive manufacturing device 900.

The memory device(s) 156 can further store data 160 that can be accessed by the one or more processor(s) 154. For example, the data 160 can include any data used for operating vibration isolation system 930 and/or additive manufacturing machine 900, as described herein. The data 160 can include one or more table(s), function(s), algorithm(s), model(s), equation(s), etc. for operating vibration isolation system 930 and/or additive manufacturing machine 900 according to example embodiments of the present disclosure.

The one or more computing device(s) 152 can also include a communication interface 162 used to communicate, for example, with the other components of system. The communication interface 162 can include any suitable components for interfacing with one or more network(s), including for example, transmitters, receivers, ports, controllers, antennas, or other suitable components.

The vibration isolation device and systems described above provide the ability to include a vibration mechanism on the powder dispenser of a build unit without degrading the operation of the energy source. In this regard, the powder dispenser may more accurately, reliably, and smoothly deposit layers of additive powder, while having a minimal effect on the accuracy of the scan unit and energy source in fusing those powders. As a result, a high printing resolution may be obtained and the additive manufacturing process may generally be improved. Other advantages to positioning system will be apparent to those skilled in the art.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A build unit for an additive manufacturing machine, the build unit comprising:
    a powder dispenser comprising a vibration mechanism, the powder dispenser configured for depositing a layer of additive powder;
    a scan unit comprising a powder fusing device for fusing a portion of the layer of additive powder;
    a gantry movably supporting the scan unit; and
    a vibration isolation device positioned between and coupling the powder dispenser and the scan unit, wherein the vibration isolation device is an active vibration canceling system such that the scan unit experiences a lower level of vibration than the powder dispenser.

2. The build unit of claim 1, wherein the active vibration canceling system comprises:
    a vibration sensor for detecting vibrations; and
    a vibrating mechanism for inducing counteracting vibrations in the scan unit.

3. The build unit of claim 1, wherein the build unit comprises:
    a recoater blade positioned adjacent the powder dispenser, the vibration isolation device being positioned between the recoater blade and the powder dispenser.

4. The build unit of claim 1, wherein the scan unit comprises:

a gasflow device that provides a substantially laminar flow of gas proximate a work surface, the vibration isolation device coupling the gasflow device and the powder dispenser.

5. The build unit of claim 4, wherein the vibration isolation device is a first vibration isolation device and the gasflow device is positioned below the powder fusing device, the build unit further comprising:
a second vibration isolation device coupling the powder fusing device and the gasflow device.

6. The build unit of claim 1, wherein the powder fusing device is an irradiation emission directing device for selectively directing an energy beam onto the layer of additive powder.

7. The build unit of claim 6, wherein the energy beam is a laser beam or an electron beam.

8. The build unit of claim 1, wherein the powder fusing device is a binder jet print head for depositing a binding agent on the layer of additive powder.

9. The build unit of claim 1, wherein the powder dispenser is coupled to scan unit through the vibration isolation device such that powder dispenser is supported in a cantilevered manner relative to scan unit.

10. The build unit of claim 1, wherein the powder dispenser is suspended from the scan unit through the vibration isolation device.

11. An additive manufacturing machine comprising:
a build unit comprising a powder dispenser and a scan unit;
a gantry movably supporting the build unit; and
a vibration isolation device positioned between and coupling the powder dispenser and the scan unit, wherein the vibration isolation device is an active vibration canceling system such that the scan unit experiences a lower level of vibration than the powder dispenser.

12. The additive manufacturing machine of claim 11, wherein the active vibration canceling system comprises:
a vibration sensor for detecting vibrations; and
a vibrating mechanism for inducing counteracting vibrations in the scan unit.

13. The additive manufacturing machine of claim 11, wherein the powder dispenser is coupled to scan unit through the vibration isolation device such that powder dispenser is supported in a cantilevered manner relative to scan unit.

14. The additive manufacturing machine of claim 11, wherein the scan unit comprises an irradiation emission directing device for selectively directing an energy beam onto the layer of additive powder.

15. The additive manufacturing machine of claim 14, wherein the energy beam is a laser beam or an electron beam.

16. The additive manufacturing machine of claim 11, wherein the scan unit comprises a binder jet print head for depositing a binding agent on the layer of additive powder.

* * * * *